United States Patent [19]
Cohn et al.

[11] Patent Number: 5,659,677
[45] Date of Patent: Aug. 19, 1997

[54] DATA STORAGE APPARATUS FOR DISK ARRAY

[75] Inventors: Oded Cohn; Yoram Novick, both of Haifa; Michael Rodeh, Oshrat; Alex Winokur, Haifa, all of Israel

[73] Assignee: International Business Machines Corporation, Armonk, N.Y.

[21] Appl. No.: 486,453

[22] Filed: Jun. 7, 1995

[30] Foreign Application Priority Data

Oct. 5, 1994 [EP] European Pat. Off. ............... 9420054

[51] Int. Cl.$^6$ ................................................. G11B 5/48
[52] U.S. Cl. .................................. 395/182.04; 371/40.4; 395/441
[58] Field of Search ..................... 395/185.01, 184.01, 395/185.07, 185.05, 180, 181, 182.03, 182.04, 427, 439, 441; 371/48, 49.3, 51.1

[56] References Cited

U.S. PATENT DOCUMENTS

| 4,490,782 | 12/1984 | Dixon | 364/200 |
|---|---|---|---|
| 4,761,785 | 8/1988 | Clark et al. | 371/51 |
| 5,301,310 | 4/1994 | Isman | 395/575 |
| 5,398,253 | 3/1995 | Gordon | 371/40.4 |
| 5,423,054 | 6/1995 | Schmidt | 395/800 |

FOREIGN PATENT DOCUMENTS

| 0 360 123 A2 | 9/1989 | European Pat. Off. | G11B 27/10 |
|---|---|---|---|
| 0 440 849 A1 | 2/1990 | European Pat. Off. | G11B 5/48 |
| 0 493 984 A2 | 12/1991 | European Pat. Off. | G06F 11/10 |

OTHER PUBLICATIONS

Gibson et al, "A Case for Redundant Arrays of Inexpensive Disks" (RAID), University of California Berkeley, ACM, 1988, pp. 109–116.

Rosenblum and Ousterhout, "The Design and Implmenations of a Log–Structured File System", ACM Transactions on Computer Systems, vol. 10, No. 1, Feb. 1992, pp. 26–52.

*Primary Examiner*—Robert W. Beausoliel, Jr.
*Assistant Examiner*—Daniel J. Ricci
*Attorney, Agent, or Firm*—Ester E. Klein

[57] ABSTRACT

A data storage disk device for a RAID disk array is disclosed, comprising a rotatably mounted disk having a data storage surface; a first head for reading data from and writing data to the data storage surface; with a second head for reading data from the data storage surface; and control means for executing a write operation to a sector, said write operation including reading the contents of the sector via the second head for subsequent processing and writing new data to the sector via the first head, the first and second heads being arranged with respect to the data storage surface so that the new data can be written to the sector on the same revolution of the disk as the reading operation. The addition of a second head to the disk storage device improves performance of the disk device for RAID applications.

15 Claims, 2 Drawing Sheets

WRITE – XOR

DATA STORAGE APPARATUS FOR DISK ARRAY

FIELD OF THE INVENTION

This invention relates to computer data storage and, more particularly, to a disk storage device for use with disk arrays comprising a number of data storage disk devices.

BACKGROUND OF THE INVENTION

A typical data processing system generally includes one or more data storage disk devices which are connected to one or more Central Processing Units (CPUs) either directly or through a control unit and a channel. Various types of magnetic or optical data storage disk devices are currently used for this purpose in computer systems.

In recent years, there has been a growth in interest in disk arrays. Disk arrays consist of a number of disk devices connected to a host computer system via one or more controller elements which control the transfer of data between the host and disk devices. A disk array is designed to provide high capacity data storage, reliability and high data transfer rates to and from the host computer system.

One penalty of employing a disk array is the potential problem of reduced reliability. The reliability of a disk array declines as the number of devices increases, since any single device failure potentially results in a complete array failure.

A number of different disk array architectures have been proposed. A paper entitled 'A Case for Redundant Arrays of Inexpensive disks (RAID)' (ACM SIGMOD conference proceedings, Chicago, Ill., Jun. 1–3, 1988, pp. 109–116) details five levels of array (RAIDS 1 to 5) which provide different levels of redundancy, space efficiency and workload dependency trade-offs. Each of the RAID levels permits users to increase their data storage capacity by linking together a number of inexpensive disk drives. Further details of the RAID Configurations may be found in the above referenced conference proceedings. RAID 5 is described in U.S. Pat. No. 4,761,785.

To avoid unacceptable degradation in system reliability, a method of enabling data recovery in the event of a (single) device failure occurring is provide by introducing 'redundancy' into the array, by either storing two copies of the data on two drives (RAID 1) or by splitting the original data into a number of subsections and striping the data across two or more drives of the array. The parity data for the striped data is calculated and stored in the array. In the event that one of the data holding drives fails, it is possible using the parity data and the remaining data of the stripe to reconstruct the data on the failed drive. The parity or checksum can be stored either on a device separate to the associated data devices (e.g. in the RAID 4 configuration) or distributed over all the available disk drives (RAID 5).

The provision of parity/checksum in a RAID system confronts the system architect with many problems. These include error-recovery, data-loss protection, system performance, and implementation complexities.

During normal Read operations, there is no performance impact encountered by supporting parity generation. However, during Write operations, the generation of parity becomes a concern. This is due to the fact that any alteration to a data area requires an associated update of the parity data relevant for that data area. The new parity written to the parity sector can be computed using the following formula:

newparity=(olddata .XOR. newdata) .XOR. oldparity.

Most currently available disk drives only provide a destructive Write operation. Therefore, the result of an update of a sector is always independent of the previous contents of the sector. Moreover, it is not generally possible to read the contents of a sector while a write operation is performed against that sector. In consequence, a straightforward implementation of a write operation in RAID is performed using a read-modify-write sequence comprising two read and two write operations: the old parity block and old data block must be read and XOR'd, and the resulting sum must then be XOR'd with the new data to provide the new parity. Both the new data and the new parity blocks must then be rewritten to the disk drives.

While the two read operations may be done in parallel, as can the two write operations, every write operation can occur only one revolution after the corresponding read operation has been completed. Therefore, modification of a block of data in a RAID system still takes much longer than the same operation on a conventional disk which does not require the preliminary read operation, and thus does not have to wait for the disk to rotate back to the previous position in order to perform the write operation. The rotational latency can amount to a substantial proportion of the time required for a typical data modification operation.

Various methods have been proposed to alleviate this difficulty, including the use of caches, see for example EP-A-493984, and the writing of an entire recovery group, constituting all data sectors plus the corresponding parity sector. This latter solution has inefficiencies since either one is holding multiple arms for serving a single small request or one is batching independent requests. Furthermore, complicated space management techniques, such as the log-structure file system described in the paper Rosenblum et al 'The Design and Implementation of a Log Structured File System' ACM Transactions on Computer Systems, Vol 10, No 1, February 1992, can result in additional overhead and performance uncertainty.

SUMMARY OF THE INVENTION

The present invention seeks to overcome the drawbacks associated with the prior art by enabling the provision of a data storage apparatus for a disk array comprising a rotatably mounted disk having data storage surface; a first head for reading data from and writing data to the data storage surface; a second head for reading data from the data storage surface, the first and second heads being arranged with respect to the data storage surface so that the new data can be written to a sector via the first head on the same revolution of the disk as a reading operation from the sector via the second head; a buffer for storing input data and/or the contents of the sector read by the second head; and control means for executing a write operation to a sector, said write operation including reading the contents of the sector via the second head, combining the contents of the sector read by the second head with input data, writing the result of the combination to the data storage surface via the first head to the sector on the same revolution of the disk.

Outside the RAID arena, data storage disk apparatus has been proposed for certain specialised applications which includes multiple heads on a single data storage surface. See for example EP-A-0440849 AND EP-A-0360123. However, it has not heretofore been appreciated that the addition of a second head to the disk storage device improves the performance of the disk device for RAID applications.

The use of the device in RAID environments is supported by the inclusion of a buffer, in one embodiment an XOR buffer, for storing input data and/or the contents of the data sector read by the second head. This enables the processing required to generate a new parity value from the old parity to be performed at least partially within the disk storage apparatus, which, in at least one embodiment, reduces traffic on the I/O bus of the device.

In a preferred form of the invention two new primitive operations which facilitate read-modify-write operations in a RAID environment are supported by the device.

Accordingly the device can be arranged to respond to a first predefined command received at the I/O port to read data from a sector on the disk storage surface for processing and to write data supplied to the I/O port to a sector with the same address on the same revolution of the disk. In a preferred form of the invention, the device is responsive to the first predefined command to combine the data read from the sector with the data supplied to the I/O port and output the result to the I/O port.

Further, the device can be arranged to respond to a second predefined command received at the I/O port to read data from a sector on the disk storage surface, to combine input data received at the I/O port with data read from the sector and to write the result of the combination to a sector with the same address on the same revolution of the disk.

The advantage of these new primitives is that in a RAID environment, a read-modify-write operation can be efficiently performed by executing the first command to write the new data sector and then the second command to write the new parity sector.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENT

Figure 1:
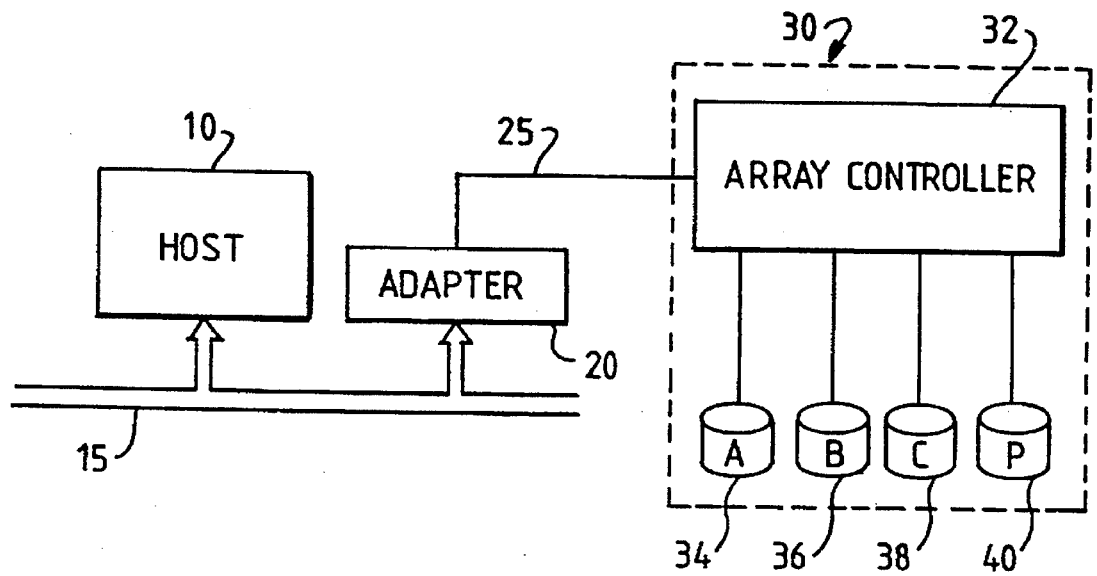
FIG. 1 shows a data processing system in which a host system is connected via a host adapter to a disk array.

FIG. 1 shows a data processing system comprising a host processor 10 connected via a host bus 15 to an array adapter 20. The adapter is connected in turn via a communication link 25 to a disk array 30 taking the form of an array controller 32 coupled to four disk data storage devices 34, 36, 38, 40 by an I/O bus, for example a SCSI bus. In this embodiment, the system is arranged according to the RAID 4 configuration with disk data storage device 40 being used to store the parity information, although it will be appreciated that the invention is equally applicable to other RAID architectures.

Apart from the modifications described below, the system operates as a conventional RAID 4 disk array. The operation of a RAID 4 disk array is well understood by those skilled in the art and will not be further described herein.

Data storage disk devices 34, 36, 38, 40 are specially adapted for use in a disk array by the addition of a further read head to the disk.

Figure 2:
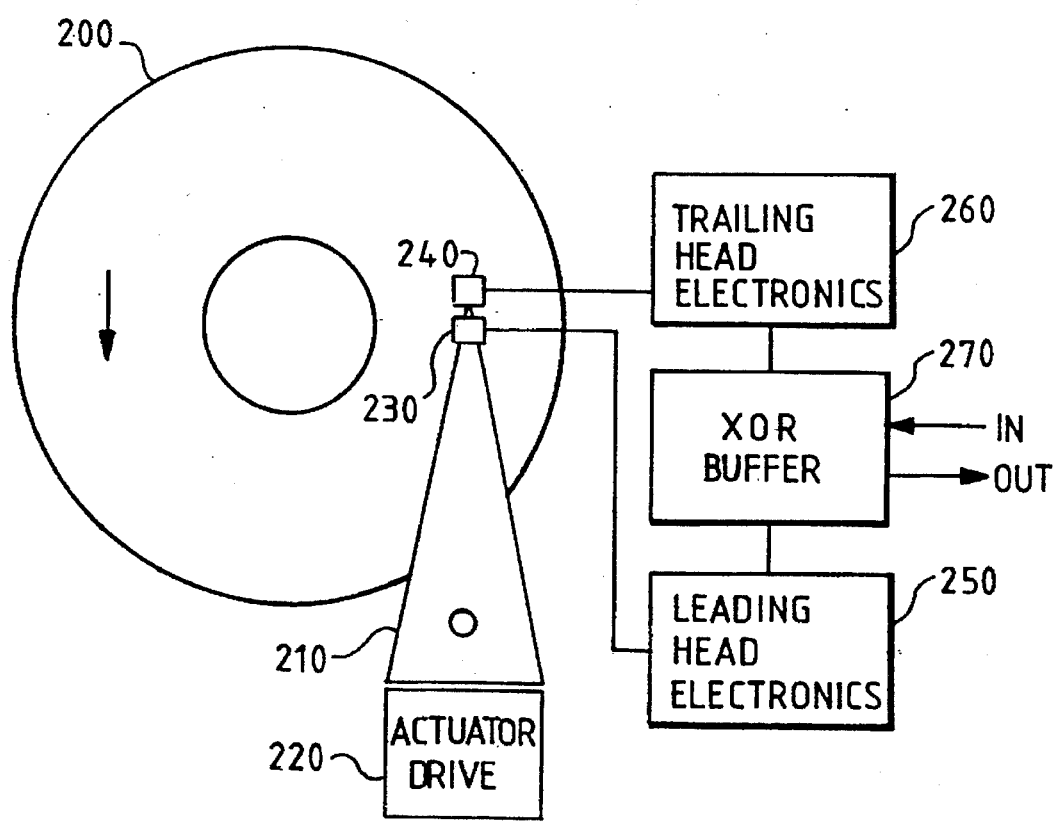
FIG. 2 shows in-schematic form an arrangement of a data storage disk and head assembly.

FIG. 2 is a schematic illustration showing one of the data storage disk devices 34, 36, 38, 40. The device comprises magnetic disk 200, actuator arm 210 and associated actuator drive system 220 which are all of conventional type. Located on actuator arm 210 are leading head 230 and trailing head 240. The arrangement is such that leading head 230 and trailing head 240 are always located over the same track of disk 200, but spaced along the track by at least the length of a single sector. The device also comprises leading and trailing head control electronics 250 and 260 respectively and XOR buffer 270.

It will be appreciated that whilst in this embodiment the leading and trailing head are located on the same actuator arm, separate actuators for the leading and trailing heads could be used. Furthermore, whilst in this embodiment the leading and trailing head are positioned over the same track, embodiments are possible as discussed below in which the two heads are less tightly coordinated.

Each disk of disk array 30 performs certain primitive operations in response to commands passed to it, using a suitable command interface, by array controller 32. In response to conventional read and write commands, trailing head 240 can be used by array controller 32 in conventional fashion to perform normal read and write operations.

However, the addition of an extra head to each disk device enables two new such primitive operations to be supported for use during write operations to the RAID disk array. These new primitive operations will be referred to as WRITE_W_READ and WRITE_XOR respectively. Whilst the present embodiment employs a disk drive with two heads, it will be understood by those skilled in the art in other embodiments these new primitives can also be supported by storage devices other than the device described herein.

The purpose of the WRITE_W_READ operation is to eliminate the need for two separate disk operations to read a data sector before updating it and to provide an output which is an XOR of the input and the current contents of the sector. This operation causes leading had 230 to read the contents of a data sector, XOR this data with input data which is passed to it by array controller 32 and pass the result to array controller 32. In the same revolution of disk 200, trailing head 240 writes the new data to the disk: It will be understood that this XOR operation could equally be performed in the array controller, in which case the WRITE_W_READ command would simply-write the new data to the sector and output the old data. Performing the XOR opera(ion in the disk device has the advantage that an XOR buffer and the associated logic is not required in the array controller.

The purpose of the WRITE_XOR operation is to eliminate the need for a separate read operation to read the parity sector before updating it. This operation receives a stream of bytes as input. The length of the stream is equal to the amount of data which is stored in one sector. This data, which will be referred to as the input image, is stored in the XOR Buffer. Following this operation, the sector of interest is updated such that the new image of the sector is related to the previous image by the following relation:

newimage=(oldimage .XOR. Inputimage).

These two new primitives make use of the additional head to reduce the number of disk accesses required to perform a write operation from four to two.

In the RAID 4 system shown in FIG. 1, write operations are carried out using these new primitives as follows. First a WRITE_W_READ primitive is used to write a new data sector on one of disks 34, 36, and 38. The input for this operation is the new data image. Then, the WRITE_XOR primitive is used to update the corresponding parity Sector on disk 40. The input for this operation is the output of a previous WRITE_W_READ operation performed against another of the disk devices, in other words the result of an XOR operation performed between the old data image and the new data image.

Whilst the present embodiment employs an XOR generated parity value, it will be understood that, in other embodiments, other error correction methods may equally be used to generate the necessary redundancy information.

Figure 3:
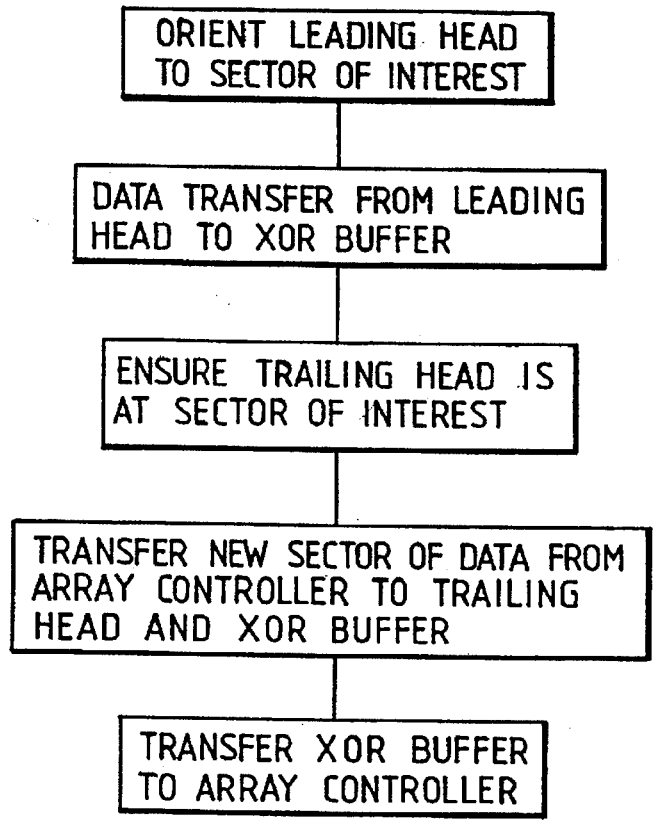
FIG. 3 is a flow diagram illustrating a WRITE_W_READ operation.
Figure 4:
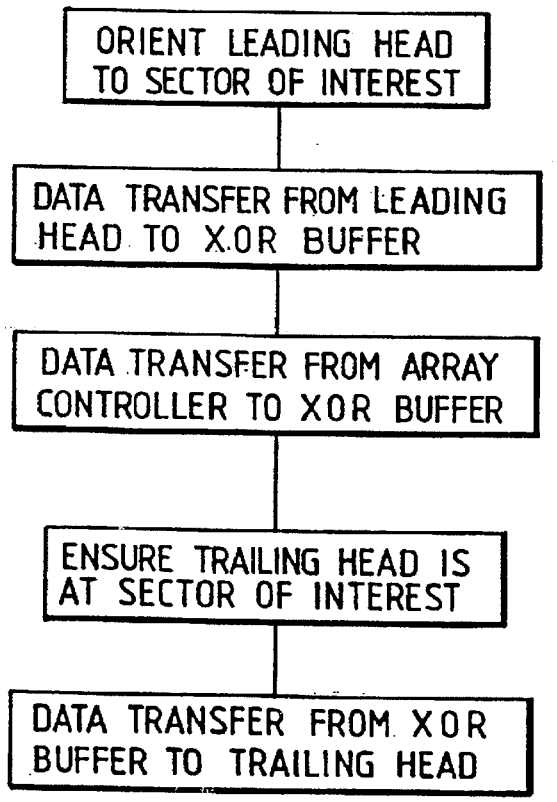
FIG. 4 is a flow diagram illustrating a WRITE_XOR operation.

XOR buffer 270 is used in the WRITE_XOR primitive to buffer data read from disk 200. Suitable control logic (not shown) for the XOR buffer 270 is provided which supports the following operations:

1. Data transfer from leading head 230 to XOR buffer 270;
2. Data transfer from array controller 32 to XOR buffer 270; and
3. Data transfer from XOR buffer 270 to trailing head 240. The data transferred to trailing head 240 is the result of an XOR operation performed between the data transferred from leading head 230 and the data transferred from array controller 32. When a WRITE_W_READ operation is received by the device from the array controller 32 the steps illustrated in FIG. 3 are taken:

1. Leading head 230 is instructed to orient to the sector of interest;
2. When leading head 230 reaches the sector of interest, data transfer from leading head 230 to XOR buffer 270 is initiated. The entire contents of the sector are transferred to XOR buffer 270;
3. Trailing head 240 is instructed to orient to the sector of interest, if it is not already there;
4. When it is ensured that trailing head 240 is over the sector of interest, A sector of data is transferred from array controller 32 to trailing head 240 and written to disk 200. The data transferred from the array controller 32 is also stored in XOR buffer 270;
5. The contents of XOR buffer 270 are transferred to array controller 32. When a WRITE_XOR operation is received by the device the steps illustrated in FIG. 4 are performed:

1. Leading head 230 is instructed to orient to the sector of interest;
2. When leading head 230 reaches the sector of interest, the following steps are performed;
   (a) A sector of data is read from disk 200 and transferred from leading head 230 to XOR buffer 270;
   (b) A sector of data is transferred from array controller 32 to XOR buffer 270;
3. Trailing head 240 is instructed to orient to the sector of interest, if it is not already there;
4. Once it has been ensured that trailing head 240 has reached the sector of interest, a sector of data is transferred from XOR buffer 270 to trailing head 240.

Some additional latency is introduced by the WRITE_W READ and WRITE_XOR operations as compared with the latency inherent in a conventional READ Sector or WRITE Sector operation. This additional latency is proportional to the distance between the leading head and the trailing head, which distance should therefore be minimised.

As mentioned above it is not essential that the leading and trailing head be located above the same track. In an alternative embodiment, a set of N+1 physical sectors are used to emulate N sectors, with a dynamic mapping between the N emulated sectors and the N+1 emulating sectors. WRITE_W_READ and WRITE_XOR operations are used in the same way as described above, except that instead of a fixed offset between the two heads they operate in a less tightly coordinated manner. First the leading head reads sector i. Then data is transferred as is or XOR'd with input from the array controller. Finally the data is written to the single unassigned sector. The mapping is changed to reflect the new address of sector i. Depending on the mapping, coordination between the two arms can preserve the performance advantage of having an extra head. For example, one track of sectors in a cylinder can serve as a temporary space for the remaining tracks on the cylinder.

While the invention has been particularly shown and described with reference to the preferred embodiment, it will be understood that various changes of form and detail may be made Without departing from the spirit and scope of the invention as defined by the appended claims.

We claim:

1. A data storage disk apparatus for a disk array (30), comprising:

a rotatably mounted disk (200) having a data storage surface comprising a plurality of tracks;

a first head (240) for reading data from and writing data to the data storage surface;

a second head (230) for reading data from the data storage surface, the first and second heads (240, 230) being arranged with respect to the data storage surface so that the new data can be written to a sector via the first head on the same revolution of the disk (200) as a reading operation from the sector via the second head wherein the first and second heads are both attached to one actuator arm (210) such that the first head is a trailing head and the second head is a leading head and the leading head and trailing head are always located over a same track;

a buffer for storing input data and/or the contents of the sector read by the second head; and control means (250, 260) for executing a write operation to a sector, said write operation including reading the contents of the sector via the second head (230), combining the contents of the sector read by the second head with input data, writing the result of the combination to the data storage surface via the first head to the sector on the same revolution of the disk.

2. The data storage apparatus as claimed in claim 1 wherein said buffer is used during an XOR operation.

3. The data storage apparatus as claimed in claim 1 arranged so that after the write operation the sector is stored at the same physical location on the data storage surface.

4. The data storage apparatus as claimed in claim 1 further comprising an I/O port.

5. The data storage apparatus as claimed in claim 4 arranged to respond to a first predefined command received at the I/O port to read data from a sector on the disk storage surface for processing and to write data supplied to the I/O port to a sector with the same address on the same revolution of the disk.

6. The data storage apparatus as claimed in claim 5 wherein responsive to the first predefined command the data read from the sector is combined with the data supplied to the I/O port and the result output to the I/O port.

7. The data storage apparatus as claimed in claim 4 arranged to correspond to a second predefined command received at the I/O port to read data from a sector on the disk storage surface, to combine input data received at the I/O port with data read from the sector and to write the result of the combination to a sector with the same address on the same revolution of the disk.

8. In a storage array system comprising a plurality of data storage devices and an array controller for controlling the transferring of data to and from the storage devices, each storage device having a data storage medium on which data and parity for a set of data are stored, a memory buffer, and a storage device controller for executing a write operation to a section of the storage medium, a method for updating old data stored on the storage medium with new data comprising the steps of:

(a) reading old data from a section of a storage medium of a first storage device into a memory buffer of said first storage device;

(b) receiving new data sent from the array controller into said memory buffer;

(c) calculating in said first storage device the parity difference between the old data and the new data;

(d) sending the calculated parity difference to the array controller;

(e) writing the new data to the storage medium of said first storage device;

(f) sending the calculated parity difference from the array controller into a memory buffer of a second storage device containing the parity associated with old data;

(g) reading the old parity for the old data into the memory buffer of said second storage device;

(h) Calculating in the second storage device the new parity for the new data from the old parity and the parity difference;

(i) writing the new parity to the storage medium of said second storage device;

wherein steps (a) through (e) are performed by a single command from the array controller to the first storage device and steps (f) through (i) are performed by a single command between the array controller and the second storage device.

9. The disk array system of claim 8 wherein each of the storage devices comprises a rotatably mounted disk having a data storage surface and one head for each data storage surface for reading data from and writing data to said surface.

10. The disk array system of claim 8 wherein each of the storage devices comprises a rotatably mounted disk having a data storage surface, a first head for reading data from and writing data to the data storage surface, and a second head for reading data from the data storage surface, the first and second heads being arranged with respect to the data storage surface so that the new data can be written to a sector via the first head on the same revolution of the disk as a reading operation from the sector via the second head.

11. A RAID disk array system comprising:

a plurality of data storage disk apparatuses, each disk apparatus having a rotatably mounted disk having data storage surface on which data and parity for a set of data are stored, one head for reading data from a data storage surface, a memory buffer and a storage device controller for executing a write operation to the storage surface;

means for reading old data from a storage surface of a disk apparatus into the memory buffer of the disk apparatus;

means for calculating the parity difference between the old data and the new data;

means for sending the calculated parity difference to the array controller; and means for writing the new data to the section of the storage surface.

12. The system of claim 11 further comprising:

means for sending the calculated parity difference from the array controller to the memory buffer of a first disk apparatus containing the parity for the old data;

means for reading the old parity for the old data into the first disk apparatus memory buffer;

means for calculating the new parity for the new data from the old parity and the parity difference in the disk apparatus; and means for storing the new parity on the storage surface of the first disk apparatus.

13. In a disk array system comprising a plurality of storage devices and an array controller for controlling the transferring of data to and from the storage devices, each storage device having a data storage medium on which data and parity for a set of data are stored, a memory buffer, and a storage device controller for executing a write operation to a section of the storage medium, a method for updating old data stored on the storage medium with new data comprising the steps of:

(a) in response to a command from the array controller to a first storage device having the old data, reading old data from said first storage device into the first storage device buffer, calculating in said first storage device the parity difference between the old data and the new data, returning said calculated parity difference to the array controller, and writing the new data to said first storage device; and (b) in response to a command from the array controller to a second storage device containing the parity for the old data, reading the old parity for the old data into the second storage device buffer, calculating in said second storage device the new parity for the new data from the old parity and the parity difference, and writing the new parity to said second storage device.

14. The disk array system of claim 13 wherein each of the storage devices comprises a rotatably mounted disk having a data storage surface and one head for each data storage surface for reading data from and writing data to said surface.

15. The disk array system of claim 13 wherein each of the storage devices comprises a rotatably mounted disk having a data storage surface, a first head for reading data from and writing data to the data storage surface, and a second head for reading data from the data storage surface, the first and second heads being arranged with respect to the data storage surface so that the new data can be written to a sector via the first head on the same revolution of the disk as a reading operation from the sector via the second head.

* * * * *